(12) United States Patent
Woolley et al.

(10) Patent No.: US 9,238,511 B2
(45) Date of Patent: Jan. 19, 2016

(54) ENGINE PYLON STRUCTURE

(71) Applicant: MRA Systems, Inc., Baltimore, MD (US)

(72) Inventors: Allen Madsen Woolley, Rose Hill, KS (US); Brian Kelby Clegg, Baltimore, MD (US); Michael Scott Just, Baltimore, MD (US); Rameshchandra Dahyabhai Patel, Wichita, KS (US)

(73) Assignee: MRA SYSTEMS, INC., Baltimore, MD (US)

( * ) Notice: Subject to any disclaimer, the term of this patent is extended or adjusted under 35 U.S.C. 154(b) by 50 days.

(21) Appl. No.: 14/196,570

(22) Filed: Mar. 4, 2014

(65) Prior Publication Data

US 2015/0251768 A1    Sep. 10, 2015

(51) Int. Cl.
   *B64D 27/26* (2006.01)
   *B64D 29/02* (2006.01)

(52) U.S. Cl.
   CPC ............... *B64D 27/26* (2013.01); *B64D 29/02* (2013.01); *B64D 2027/264* (2013.01); *B64D 2027/268* (2013.01)

(58) Field of Classification Search
   CPC .......................... B64D 27/26; B64D 2027/264
   See application file for complete search history.

(56) References Cited

U.S. PATENT DOCUMENTS

| | | | |
|---|---|---|---|
| 3,848,832 A * | 11/1974 | Stanley et al. | 244/54 |
| 3,948,469 A * | 4/1976 | Brown | 244/54 |
| 4,531,694 A | 7/1985 | Soloy | |
| 5,064,144 A | 11/1991 | Chee | |
| 5,806,792 A | 9/1998 | Brossier et al. | |
| 6,126,110 A | 10/2000 | Seaquist et al. | |
| 6,935,591 B2 | 8/2005 | Udall | |
| 7,063,290 B2 | 6/2006 | Marche | |
| 7,100,869 B2 | 9/2006 | Picard et al. | |
| 7,104,306 B2 * | 9/2006 | Huggins et al. | 164/47 |
| 7,121,504 B2 | 10/2006 | Machado et al. | |
| 7,156,343 B2 | 1/2007 | Marche | |
| 7,159,819 B2 | 1/2007 | Machado et al. | |
| 7,232,091 B2 | 6/2007 | Marche | |
| 7,296,768 B2 | 11/2007 | Machado et al. | |
| 7,350,747 B2 | 4/2008 | Machado et al. | |
| 7,398,945 B2 * | 7/2008 | Huggins et al. | 244/54 |
| 7,740,200 B2 | 6/2010 | Diochon et al. | |
| 7,789,344 B2 | 9/2010 | Cousin et al. | |
| 7,797,947 B2 | 9/2010 | Lafont et al. | |
| 7,931,232 B2 * | 4/2011 | Bernardi et al. | 244/54 |
| 7,971,825 B2 | 7/2011 | Diochon et al. | |

(Continued)

FOREIGN PATENT DOCUMENTS

| | | | |
|---|---|---|---|
| EP | 0761945 B1 | 5/2001 | |
| EP | 0855536 B1 | 6/2003 | |

(Continued)

OTHER PUBLICATIONS

PCT Search Report and Written Opinion issued in connection with corresponding PCT Application No. PCT/US2015/017267 on May 20, 2015.

*Primary Examiner* — Joseph W Sanderson
(74) *Attorney, Agent, or Firm* — GE Global Patent Operation; William S. Munnerlyn

(57) ABSTRACT

A pylon structure for mounting an aircraft engine to a wing. The pylon structure comprises a torque box having a wing mount on the aft portion, a first engine mount on the fore portion and second engine mount on the aft portion.

14 Claims, 3 Drawing Sheets

(56) References Cited

U.S. PATENT DOCUMENTS

| | | | |
|---|---|---|---|
| 8,146,856 B2 | 4/2012 | Combes et al. | |
| 8,167,238 B2 | 5/2012 | Gardes et al. | |
| 8,177,166 B2* | 5/2012 | Haack | 244/119 |
| 8,226,028 B2 | 7/2012 | Marche | |
| 8,226,029 B2 | 7/2012 | Haramburu et al. | |
| 8,251,311 B2 | 8/2012 | Combes et al. | |
| 8,336,812 B2 | 12/2012 | Beaufort et al. | |
| 8,353,476 B2* | 1/2013 | Crook et al. | 244/54 |
| 8,382,031 B2* | 2/2013 | Dussol et al. | 244/54 |
| 8,413,925 B2 | 4/2013 | Martinou et al. | |
| 8,561,943 B2* | 10/2013 | Crook et al. | 244/54 |
| 9,027,875 B2* | 5/2015 | West | 244/54 |
| 2005/0116093 A1* | 6/2005 | Machado et al. | 244/54 |
| 2005/0178889 A1* | 8/2005 | Machado et al. | 244/54 |
| 2005/0274485 A1* | 12/2005 | Huggins et al. | 164/349 |
| 2007/0120010 A1* | 5/2007 | Huggins et al. | 244/54 |
| 2008/0217502 A1* | 9/2008 | Lafont | 248/554 |
| 2008/0251634 A1* | 10/2008 | Bernardi et al. | 244/54 |
| 2009/0108127 A1* | 4/2009 | Cazals | 244/54 |
| 2011/0011972 A1* | 1/2011 | Vache | 244/54 |
| 2011/0101163 A1* | 5/2011 | Haack | 244/119 |
| 2011/0121132 A1* | 5/2011 | Crook et al. | 244/54 |
| 2011/0127368 A1* | 6/2011 | Penda et al. | 244/54 |
| 2011/0127371 A1* | 6/2011 | Takeuchi | 244/54 |
| 2011/0174918 A1 | 7/2011 | Lebas et al. | |
| 2012/0104162 A1* | 5/2012 | West | 244/54 |
| 2013/0140281 A1* | 6/2013 | Crook et al. | 219/121.14 |

FOREIGN PATENT DOCUMENTS

| | | |
|---|---|---|
| EP | 1375348 B1 | 8/2008 |
| FR | 2909973 A1 | 6/2008 |
| FR | 2915178 A1 | 10/2008 |
| WO | 9518042 A1 | 7/1995 |

* cited by examiner

ENGINE PYLON STRUCTURE

BACKGROUND OF THE INVENTION

Contemporary aircraft may include a mounting structure to mount an engine to the wing of an aircraft. Typical mounting structures include a plurality of interconnected trusses that create a space frame to carry the loads of the engine into the wing. The design of such mounting structures take into account resistance to engine loads, mass of the structure and structural integrity of the structure in the event of an uncontained engine rotor failure.

BRIEF DESCRIPTION OF THE INVENTION

In one aspect, an embodiment of the invention relates to a pylon structure for mounting an aircraft engine to a wing. The pylon structure comprises a torque box having a wing mount on the aft portion, a first engine mount on the fore portion and second engine mount on the aft portion.

DESCRIPTION OF EMBODIMENTS OF THE INVENTION

Figure 1:
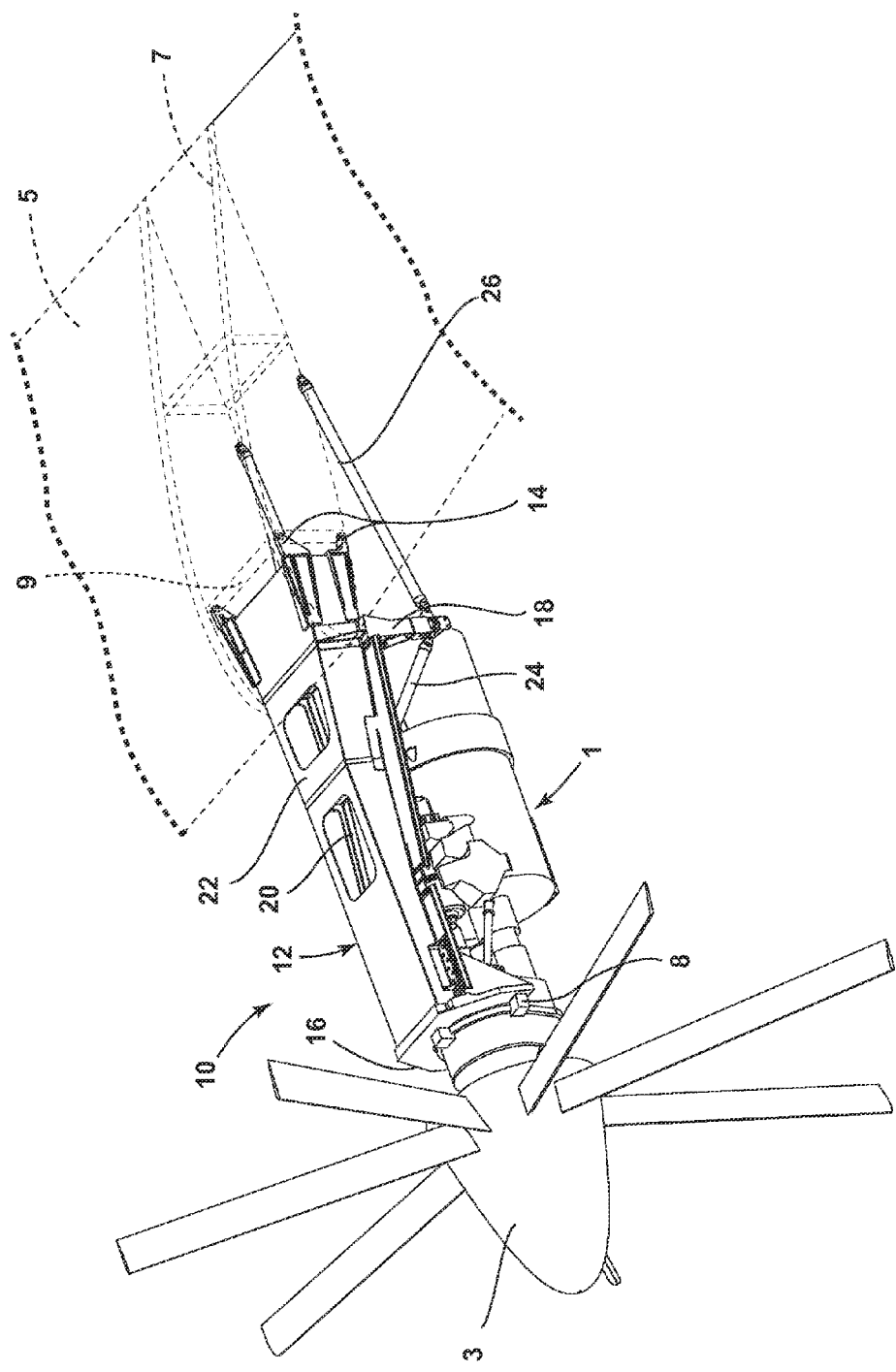
FIG. 1 is perspective view of a portion of an aircraft including an engine, pylon structure and a wing shown in phantom according to an embodiment of the invention.

FIG. 1 illustrates a pylon structure 10 for mounting an engine 1 to the wing 5 of an aircraft according to an embodiment of the invention. The pylon structure 10 may be configured for securing the engine 1 to a portion of the wing 5, such as the wings spar 9 and wing ribs 7. The nacelle has been removed for clarity as the nacelle surrounds the engine 1 and at least a portion of the pylon structure 10. The wing 5 is shown in phantom also for clarity.

The engine 1 is a turboprop engine having a propeller 3 and may be coupled to the wing 5 of an aircraft to provide propulsion. While only one engine 1 is illustrated mounted to the wing 5, it should be noted that that any number of engines 1 may be mounted to the wing 5. While a commercial aircraft having a turboprop engine has been illustrated, it is contemplated that embodiments of the invention may be used in any type of aircraft, for example, without limitation, fixed-wing, rotating-wing, and military aircraft, and may be used for any type of engine, for example, without limitation, turboshaft, turbojet, turbofan and reciprocating engines.

The pylon structure 10 comprises a torque box 12, which is mounted by wing mounts 14 to the wing. First and second engine mounts 16, 18 along with connecting rods 24 and thrust links 26, mount the engine 1 to the torque box 12. The pylon structure 10 reacts with engine loads, including but not limited to the engine weight, thrust and torque and creates a load path for the loads into the wing 5 of the aircraft. As will become clear from the following description, the loads are transferred through the engine mounts 16, 18, the torque box 12, connecting rods 24 and thrust links 26 into the front spar 9 and ribs 7 of the wing 5. The pylon structure 10 is configured to react loads generated by an engine 1 having a horsepower (HP) in the range of 5,000 HP but it is contemplated that embodiments of the invention may be used to react loads from an engine having any horsepower or thrust rating.

The torque box 12 extends along a longitudinal axis between the first engine mount 16 and the wing mounts 14 wherein the longitudinal axis is defined as extending through the center of the torque box 12 from the first engine 16 to second engine mount 18. The first engine mount is provided on a fore portion of the torque box 12 wherein fore is defined as in the direction of the propeller 3 from the wing 5. The second engine mount 18 is provided on an aft portion of the torque box 12 wherein aft is defined as in the direction of the wing 5 from the propeller 3.

The torque box 12 may be mounted to the engine 1 such that it is disposed substantially above the engine 1. The first engine mount 16 mounts to the engine 1 at a fore portion of the engine 1 aft of the propeller 3 wherein fore mounting supports 8 configured to mate with the first engine mount 16 are disposed. The second engine mount 18 mounts to the engine 1 in an aft portion of the engine 1 wherein aft mounting supports (not shown) configured to mate with the second engine mount 18 are disposed.

The wing mounts 14 are provided on an aft portion of the torque box 12 configured to mate with the spar 9 of the wing 5. The wing mounts 14 may comprise multiple brackets 14a, 14b, 14c, 14d (shown FIGS. 2 and 3). The wing mounts 14 acts as the load transferring component of the pylon structure 10 to direct loads from the engine 1 into the spar 9 of the wing 5. Loads directed through the torque box 12 from the first and second engine mounts 16, 18 may travel through the wing mounts 14 into the spar 9 of the wing 5. The wing mounts 14 acts as the primary load path to direct engine loads into the spar 9.

The connecting rods 24 extend from the second engine mount 18 to a portion of the torque box 12 aft of the first engine mount 16 in both the longitudinal and downward directions. The thrust links 26 extend from the second engine mount 18 to the wing 5 in both the longitudinal and upwards direction. Loads directed through the torque box 12 may travel through the connecting rods 24, second engine mount 18 and thrust links 26 into the ribs 7 of the wing 5. The connecting rods 24 and thrust links 26 act as a secondary load path to direct portion of the loads into the ribs 7 so as to reduce the loads transferred into the spar 9.

Figure 2:
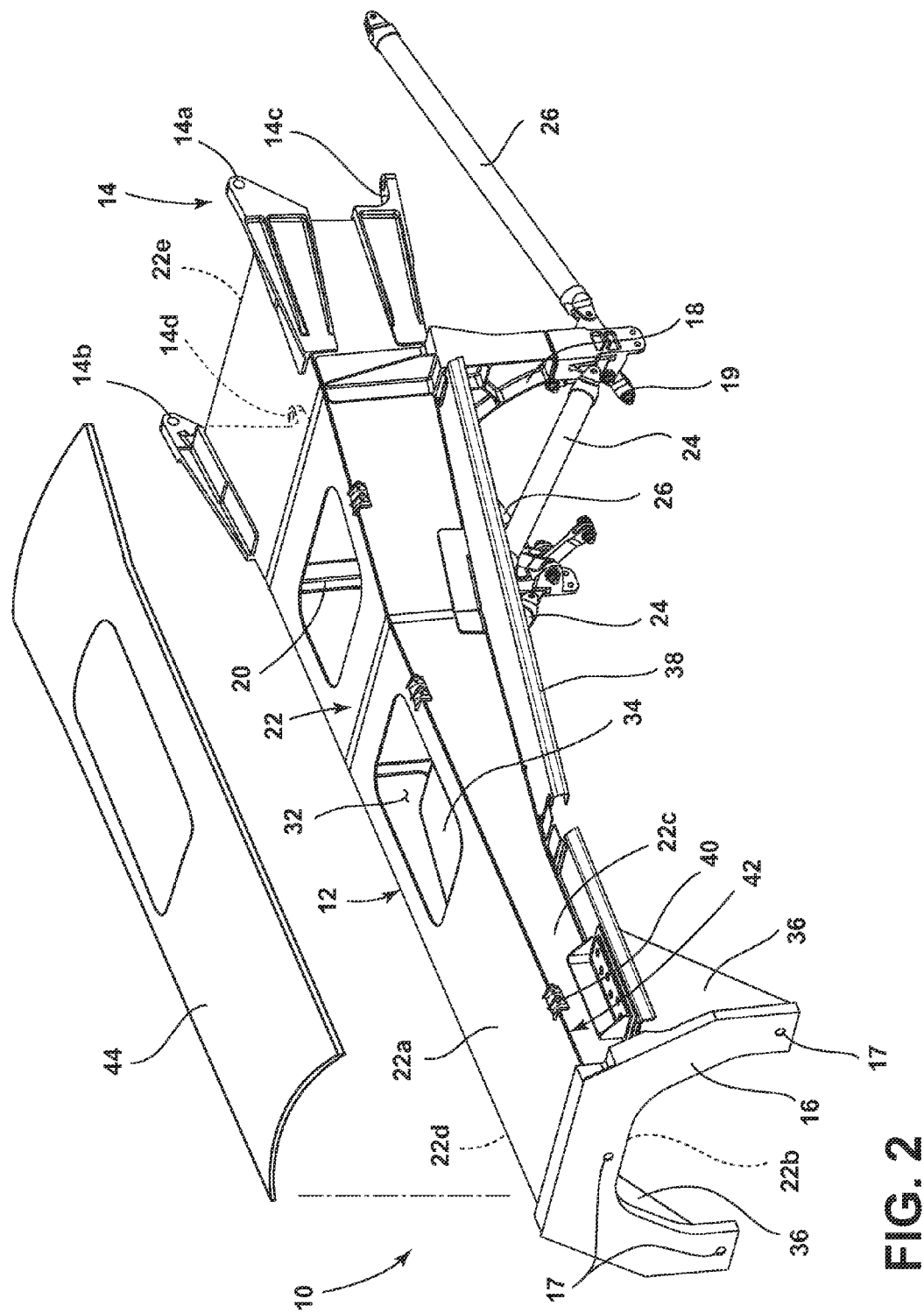
FIG. 2 is perspective view of the pylon structure of FIG. 1 with a cover fairing showing exploded according to an embodiment of the invention.

The torque box 12 comprises a skeletal frame 20 and stressed skins 22 mounted to the skeletal frame 20. FIG. 2 more clearly illustrates the stressed skins 22 of the torque box 12. The stressed skins 22 comprise a top skin 22a, bottom skin 22b, side skins 22c, 22d and aft skin 22e (best seen in FIG. 3) wherein the stressed skins 22 may cover the outer portions of the skeletal frame 20.

The first and second engine mounts 16, 18 may comprise a yoke configured to correspond to a portion of the engine 1 to mount to the fore engine supports 8 (shown in FIG. 1). The first engine mount may be provided on the fore portion of the torque box 12. Gussets 36, extending between the first engine mount 16 and the torque box 12, may be provided to aid in transferring engine loads to the torque box 12 by triangulating the first engine mount 16 to torque box 12 interface to improve the load transferring characteristics thereof. The second engine mount 18 may comprise a plurality of brackets 19 of the like for mounting to the aft engine supports (not shown). The second engine mount 18 mounts to the aft portion of the torque box 12 encompassing a portion of the side skins 22c, 22d.

Figure 3:
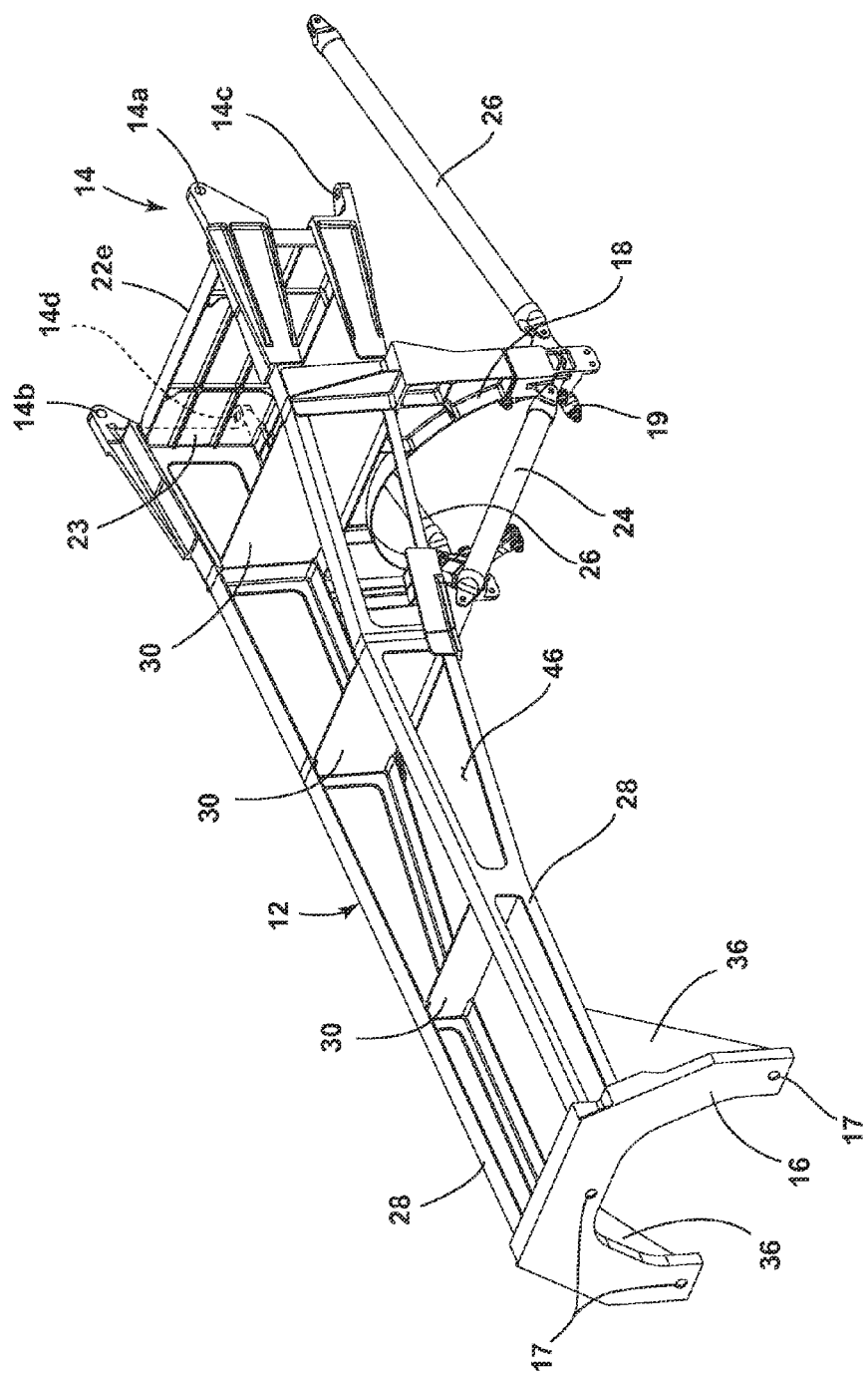
FIG. 3 is a perspective view of the pylon structure of FIG. 1 with portions of the stressed skins and other components removed according to an embodiment of the invention.

FIG. 3 shows the pylon structure 10 with the top, bottom and side skins 22 removed to more clearly illustrate the skeletal frame 20. The skeletal frame 20 comprises a plurality of formers 30 in the form of webs spaced along the longitudinal axis of the torque box 12. The formers 30 are connected to at least two stringers 28 disposed between the first and second engine mounts 16, 18 radially offset from the longitudinal axis of and on opposite sides of the torque box 12. The stringers 28 may have a planarity of voids 46 formed in the stringer 28 in order to save weight. The aft skin 22e connects between the stringers 28 at the aft portion of the torque box 12 between the wing mounts 14 and may comprise a monolithic grid structure 23 to add rigidity to the aft skin 22e.

Referring again to FIG. 2, the stressed skins 22 are mounted to the skeletal frame 20 so that the stressed skins 22 provide tension between the members of the skeletal frame 20. Furthermore, the stressed skins 22 may be integrally formed with portions of the skeletal frame 20 or as separate pieces. The combination of the skins 22 and the skeletal frame 20 form a box beam structure, which is substantially more resistant to reacted torque from the engine than traditional pylon structures that use a truss frame.

The top skin 22a may comprise at least one opening 32 configured to allow access to an engine controller compartment defined by the torque box 12 wherein an engine control unit 34 may be mounted. It is contemplated that other components may be mounted inside the torque box, for example, without limitation, electrical wiring and fuel lines. A thermal barrier 38 may be disposed under the bottom skin 22b and mounted thereto. A plurality of hinges 40 may be mounted to the torque box 12, defining a hinge line 42 so as to pivotally mount a fairing 44 to the torque box 12. The fairing 44 may be pivotally mounted to the hinges 40 along the hinge line 42 to selectively allow or prevent access to the opening 32 as well as provide aerodynamic properties.

The embodiments described above provide for a variety of benefits including that the embodiments allow for a structurally efficient (low weight) load path to direct engine loads into the wing of the aircraft. The box beam structure of the torque box 12 provides much greater resistance to reacted torque from the engine. The torque box 12 is also mounted to the leading edge of the wing, which simplifies the offset from the engine output shaft to the rotational axis of the propeller. In turboprop aircraft, for efficiency purposes, it is desirable to locate the rotational axis of the propeller along the leading edge of the wing, which results in an offset between the engine output (drive shaft or the like) and the propeller drive shaft. This offset is normally filled by some type of drive mechanism connecting the engine output and the propeller drive shaft. Prior pylon structures mount to the underside of the wing and further increase the distance between the engine output and the propeller drive shaft. The torque box 12 of the invention mounts to the leading edge of the wing, which does not increase the distance between the engine output and the propeller drive shaft.

The inherent compartments of the torque box 12 formed within the stressed skins 22 between the formers 30 and stringers 28 of the skeletal frame 20 provide mounting locations for components, such as an engine control unit 34, away from the engine 1 which reduces engine heat applied to the components and thereby increases component life as well as eliminates the need for dedicated component mounting locations, thereby saving weight. The openings in the torque box 12 with integrated hinge line 42 allow for efficient access to components mounted therein, thereby reducing maintenance times and eliminating the need for a hinge beam which saves weight. The wing mounts 14 provided on the aft most portion of the torque box 12 allows the torque box 12 to be mounted in front of the spar 9, enabling the engine 1 to be mounted closer to the wing 5, improving the propeller aerodynamics. By providing a secondary load path through the thrust links 26 into the ribs 7 of the wing 5, the loads applied to the spar 9 are reduced, thereby allowing for smaller spars with reduced weight. Furthermore, disposing the torque box 12 above the engine 1, minimizes the critical load bearing structure (torque box 12) surrounding the engine 1, resulting in a lower probability of failure in the event of a rotor burst event as well as provides open access to greater portions of the engine 1 which reduce maintenance times.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pylon structure for mounting an aircraft engine to a wing, comprising:
   a torque box;
   a wing mount having a front spar mount provided on an aft portion of the torque box;
   a first engine mount provided on a fore portion of the torque box;
   a second engine mount provided on the aft portion of the torque box;
   connecting rods extending from the second engine mount to the torque box aft of the first engine mount; and
   thrust links extending from the second engine mount to the wing,
   wherein a primary load path is defined by the loads directed through the torque box from the first and second engine mounts and primary loads travel through wing mounts into the front spar of the wing; and
   wherein a secondary load path is defined by the loads directed through the torque box that travel through the connecting rods to the second engine mount and the thrust links into ribs of the wing.

2. The pylon structure of claim 1 wherein the torque box comprises a skeletal frame with stressed skins mounted to the skeletal frame.

3. The pylon structure of claim 2 wherein the skeletal frame comprises a plurality of formers.

4. The pylon structure of claim 3 wherein the torque box has a longitudinal axis and at least some of the formers are spaced along the longitudinal axis.

5. The pylon structure of claim 3 wherein a plurality of formers are connected by a plurality of stringers.

6. The pylon structure of claim 5 wherein the torque box has a longitudinal axis and at least some of the stringers are radially offset from the longitudinal axis.

7. The pylon structure of claim 1 wherein the first engine mount comprises a first yoke mounted to the fore end of the torque box.

8. The pylon structure of claim 7 wherein the first engine mount further comprises gussets extending from the first yoke to the torque box.

9. The pylon structure of claim 7 wherein the second engine mount comprises a second yoke.

10. The pylon structure of claim 9 further comprises at least one thrust link extending from the second yoke aft of the wing mount.

11. The pylon structure of claim 1 wherein the front spar mount comprises multiple brackets mounted to the aft end.

12. The pylon structure of claim 1 wherein the torque box defines an engine controller compartment and has an opening providing access to the engine controller compartment.

13. The pylon structure of claim 12 further comprising a fairing covering the opening to the engine controller compartment.

14. The pylon structure of claim 1 further comprising a hinge line provided along the torque box.

* * * * *